United States Patent Office 3,616,626
Patented Nov. 2, 1971

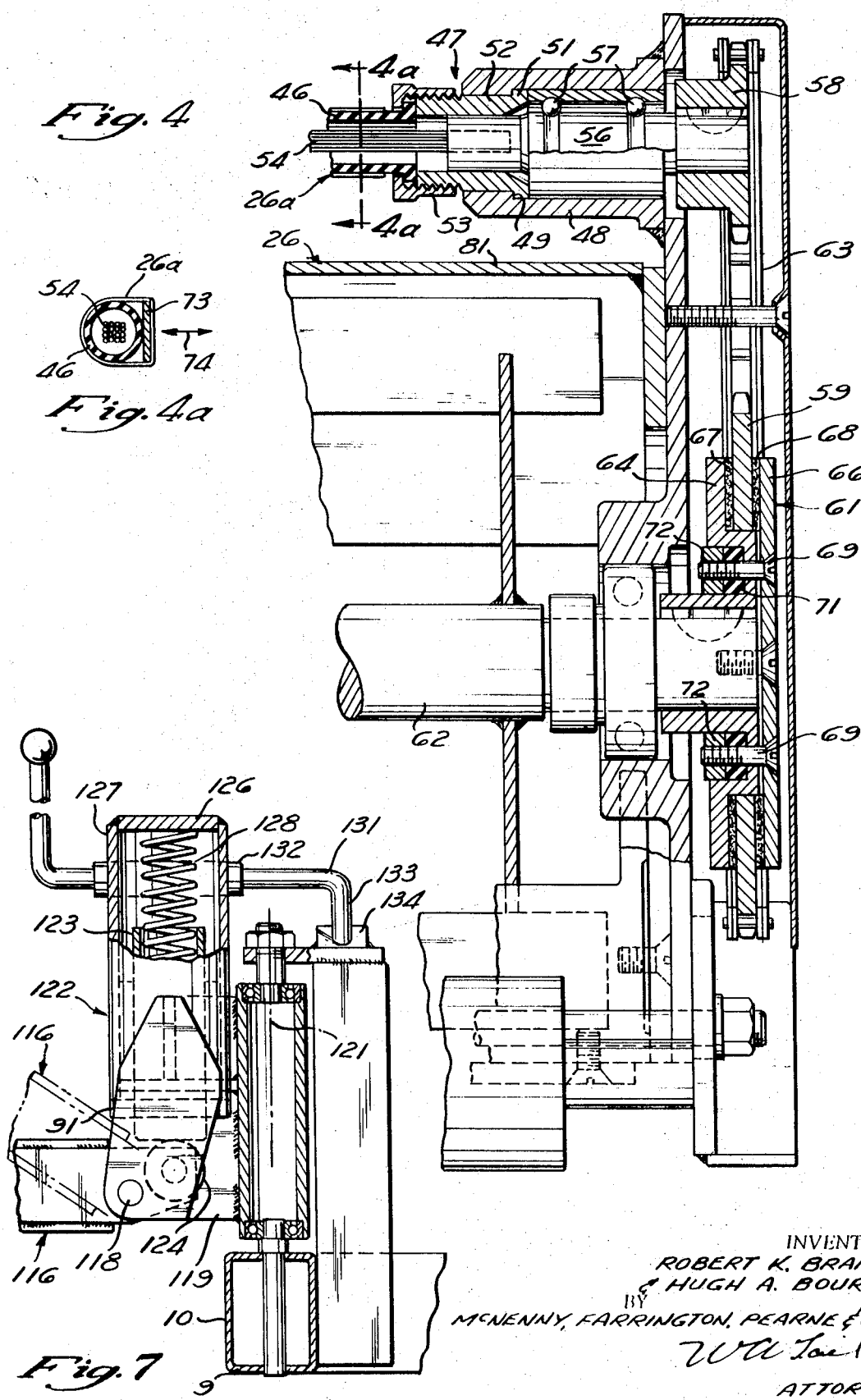

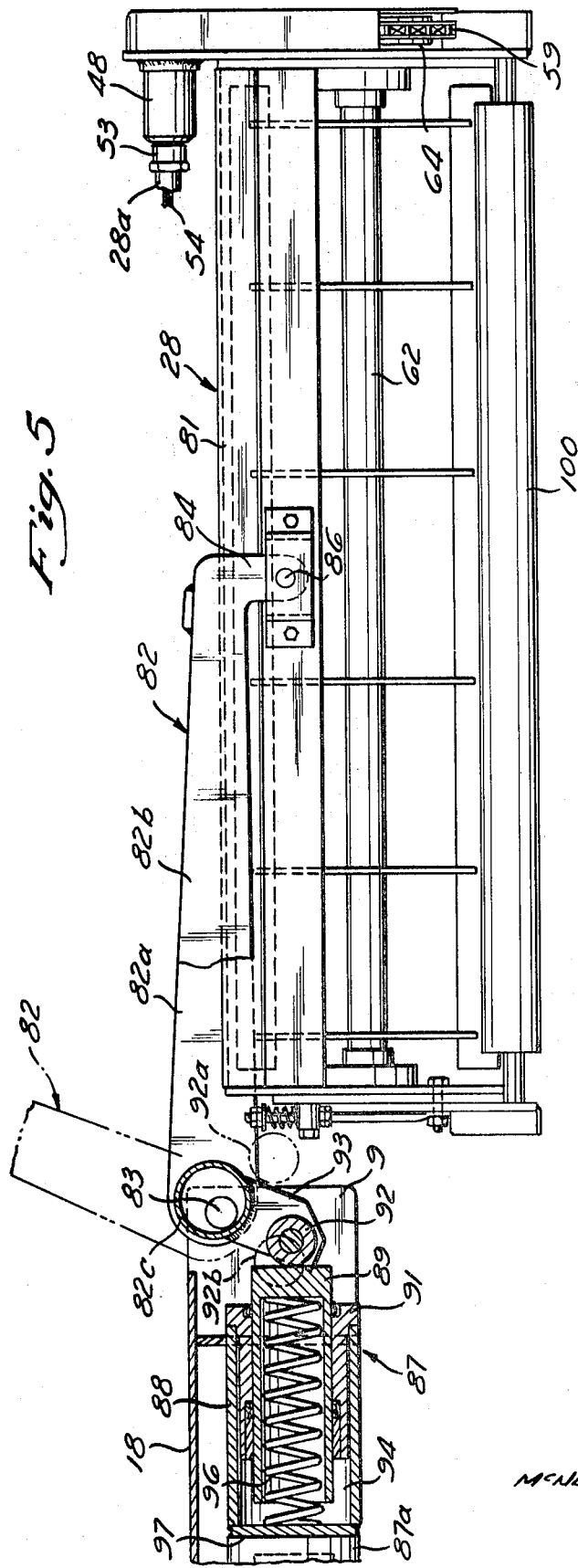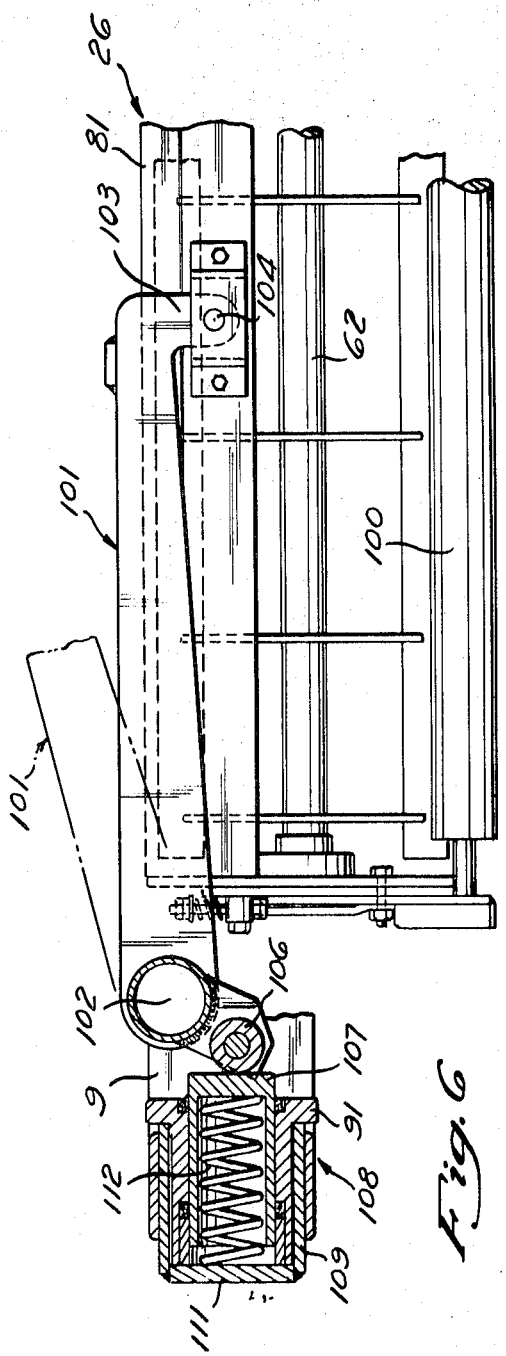

3,616,626
MOWER
Robert K. Bramley, Cleveland, and Hugh A. Bourassa, University Heights, Ohio, assignors to Hahn, Inc., Evansville, Ind.
Filed Feb. 14, 1968, Ser. No. 705,395
Int. Cl. A01d 75/30
U.S. Cl. 56—7
5 Claims

ABSTRACT OF THE DISCLOSURE

A power mower including five reel-type mower units mounted on a motor driven vehicle. The forward vehicle wheels are driven and the rearward wheels are steerable. The operator's seat is at the front of the vehicle. Two forward reel mower units are mounted with one on each side of the vehicle positioned to overlap a center reel unit mounted behind the drive wheels at the center of the vehicle. Two outboard reel units are mounted with one on each side of the vehicle in substantial alignment with the center unit. Each of the reels is driven by the vehicle mounted engine through a flexible cable drive including an automatic overload slip clutch. Each of the mower units is provided with a power retraction unit for moving the units toward the retracted position from the operative position. Counterbalancing is provided in the retraction units to support a substantial portion of the weight of each unit. The mowers are free floating and can raise and lower as well as tip to follow the ground contour.

BACKGROUND OF THE INVENTION

This invention relates generally to power mowers and more particularly to a novel and improved wide-swath mower provided with a plurality of reel-type mowers.

Various types of wide-swath mowers with multiple reel-type units have been provided. One of the simplest types is the so-called "gang mower" which consists of a plurality of mowers pulled by a vehicle and connected thereto by a towing frame which maintains the mower units in a predetermined relationship. In such mowers the reels are driven by the mower wheels as they roll along the ground. Such "gang mowers" have a tendency to skip and provide an uneven cut particularly when they encounter heavy grass or when the grass is wet and slippery.

In order to overcome the skipping problem, other types of multiple-unit mowers have been provided wherein the vehicle engine is connected to drive the reels. Generally in the past such mowers, with power driven reels, have been complicated since the reel mower units should be free to move with respect to the vehicle so the mower units can follow the contour of the ground. In the past such power drives have often been relatively complicated in order to accommodate relative movement between the mower units and the vehicle mounted engine. In many instances the movement of the mower units has been restricted so that the drive can be simplified. However, when this is done the mowing quality is reduced since the mower units cannot freely follow the ground contour.

SUMMARY OF INVENTION

A multiple unit reel-type mower is disclosed which provides improved mowing quality with a simplified structure. The mower units are free floating so they can freely move to follow the ground contour. A simplified flexible cable power drive is provided to drive the reels from the vehicle mounted engine. This drive can accommodate all of the required relative movement between the mowers and the vehicle so it is not necessary to restrict mower movement for purposes of simplifying the power drive.

A mower support is provided with a power lift means to move the mower between the retracted position and an extended operating position. The power lift means incorporates counterbalancing means to support a substantial portion of the mower weight even when the mowers are in the operating position. Therefore, only a small portion of the weight of the mower is supported on the ground. This arrangement minimizes any tendencies for the mower to dig into the ground during operation over rough terrain.

In the illustrated embodiment of this invention a vehicle is provided with the drive wheels located adjacent to the front end of the vehicle and the steering wheels are located at the rearward end of the vehicle. The operator's seat is at the forward end of the vehicle so his view of the area being mowed is completely unobstructed and it is easy for the operator to get on and off of the vehicle.

There are five reel units supported by the vehicle. A center reel unit is located immediately behind the drive wheels and in front of the steering wheels. This unit may be raised to a retracted position by power lift means. Located ahead of the drive wheels are two mower units with one located on either side of the central axis of the vehicle. The forward mower units are retractable from their extended operating position to a substantially vertical position. Also two outboard reel units are located immediately behind the vehicle drive wheels substantially in alignment with the center unit. The outboard units are also retractable from the extended operating position. During retraction of the outboard units, they swing to a position over the steerable wheels of the vehicle. When the forward reel units and outboard reel units are retracted, they are spaced from the center line of the vehicle by a distance less than the distance between the center line of the vehicle and the outside of the drive wheels. Therefore, the vehicle can be driven through any opening large enough to pass the drive wheels when the mower units are retracted.

All of the reel units are located substantially equidistant from the axis of rotation of the drive wheels of the vehicle and relatively close to the axis. Since the drive wheels are not steerable, turning of the vehicle occurs about a center of turning located substantially along a turning line which coincides with the axis of rotation of the drive wheels. By arranging each of the mower units so that they are substantially equally spaced from the turning line, a minimum amount of overlap is required without encountering any skipping in the cut when the vehicle turns. Further, location of the mowers relatively close to the turning line reduces the amount of skidding or lateral sliding of the mowers even when the vehicle turns about a relatively short radius.

OBJECTS OF INVENTION

It is an important object of this invention to provide a novel and improved multiple unit reel-type mower which incorporates structural simplicity and efficiency in operation.

It is another important object of this invention to provide a novel and improved power mower according to the preceding object wherein a flexible shaft drive connects each mower unit to a single power source.

It is still another object of this invention to provide a novel and improved power mower according to either of the preceding objects wherein the mowers are mounted for substantially unrestricted movement to follow the ground contour and wherein power means are provided to retract the mower units when not in use.

It is still another object of this invention to provide a power mower according to the last preceding object wherein counterbalancing means are provided to support a substantial portion of the weight of each mower unit when the mower units are in the operative position.

It is still another object of this invention to provide a power mower according to any of the preceding objects wherein the operator sits at the forward end of the mower and has a clear, unobstructed view of the area being mowed.

It is still another object of this invention to provide a power mower according to any of the preceding objects wherein the mower units are substantially equally spaced from the turning line of the vehicle to minimize the amount of overlap required between mower units to avoid skipping during turns or the like.

It is still another object of this invention to provide a power mower according to the preceding object wherein the mower units are located close to the turning line of the vehicle to minimize lateral sliding of the mower units during the turning of the vehicle.

Further objects and advantages will appear from the following description and drawings wherein:

FIG. 4 is an enlarged fragmentary section illustrating the power unit end of the mower units;

FIG. 4a is a cross section of the flexible cable taken along 4a—4a of FIG. 4;

FIG. 5 is an enlarged fragmentary section taken generally along 5—5 of FIG. 1 illustrating the structure for supporting, counterbalancing, and lifting one forward mower unit;

FIG. 6 is a fragmentary section taken generally along 6—6 of FIG. 1 illustrating the structure for supporting, counterbalancing, and retracting the center mower unit; and, FIG. 7 is a fragmentary section taken generally along 7—7 of FIG. 1 illustrating the structure for supporting, counterbalancing, and retracting the outboard mower units.

Figure 1:
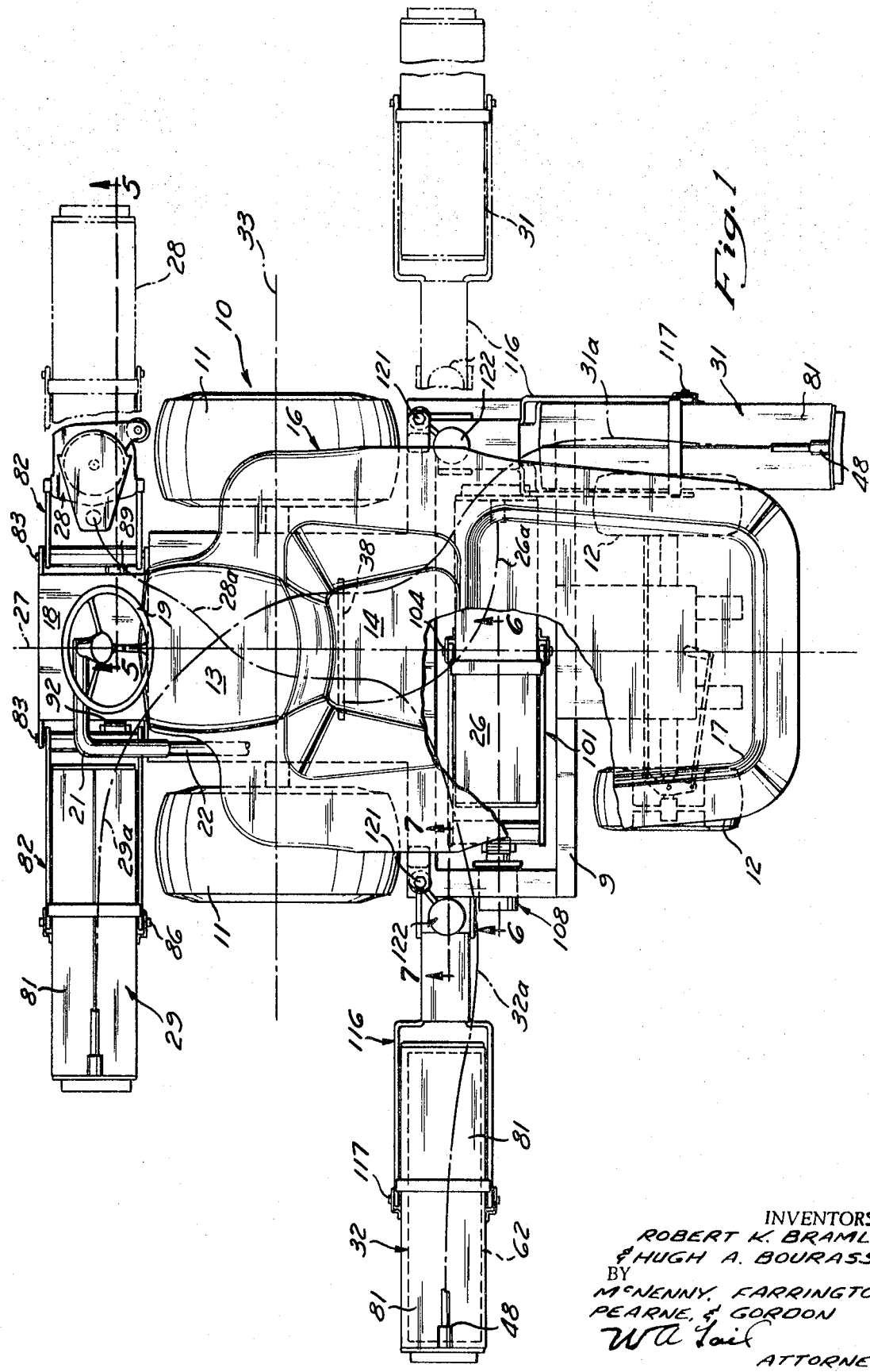
FIG. 1 is a plan view of a mower incorporating this invention illustrating two of the side mowers in the retracted position and further illustrating in phantom these mowers in the extended operating position.
Figure 2:
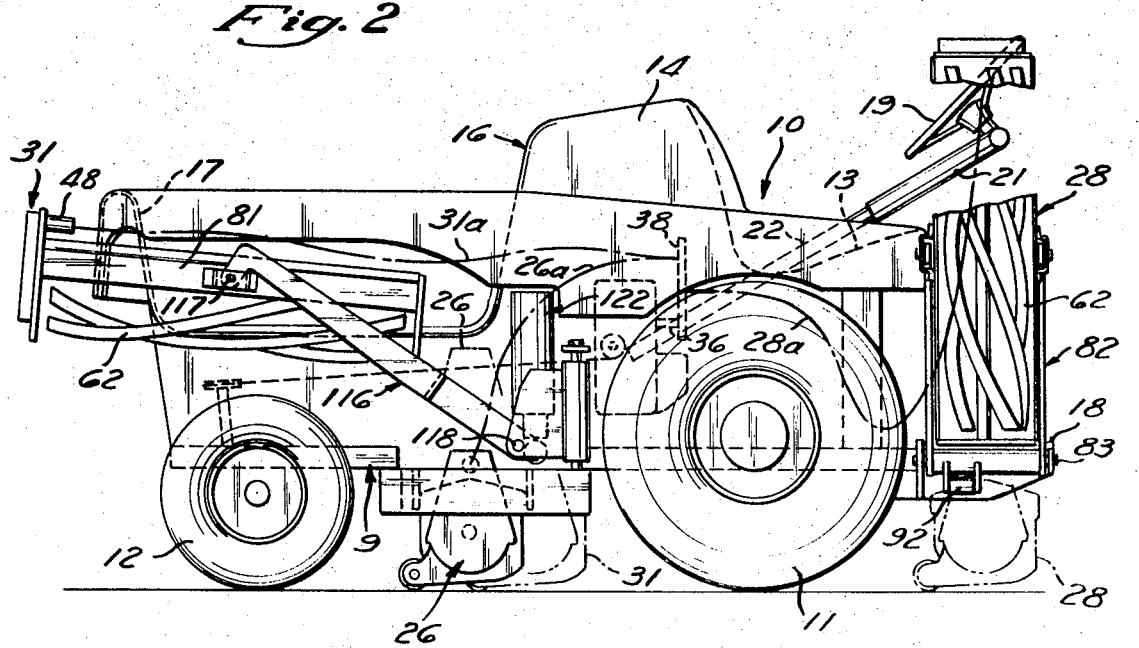
FIG. 2 is a side elevation of the mower in FIG. 1 with parts cut away for purposes of illustration.

Referring to FIGS. 1 and 2, the disclosed embodiment of this invention includes a motor driven vehicle 10 having a frame 9, forward drive wheels 11 and steerable rearward wheels 12. Located at the forward end of the vehicle is an operator's seat 13 which is immediately forward of an engine compartment 14. The engine compartment 14 encloses an engine which is arranged to drive the drive wheels 11 and is provided with a power takeoff connected to drive the mowers in a manner described in detail below.

Since the particular engine arrangement and the arrangement for connecting the engine to the drive wheels is not critical to this invention, the engine and wheel drive are not illustrated. It is preferable, however, that the engine be connected to the drive wheels through a variable speed drive so that the engine speed can be adjusted independently of vehicle speed to provide the optimum mower speed for the particular cutting operation being performed. Such a variable speed drive may comprise one or more variable output hydraulic pumps driven by the engine and hydraulic motors coupled to the drive wheels 11 and connected to be driven by the pumps. One such hydraulic drive is commercially available from Sunstrand Corporation and is marketed under the trade name Hydrogear. The use of a hydraulic drive for the drive wheels, which includes one or more hydraulic pumps driven by the engine, is preferable since the same pumps may be used to supply the hydraulic fluid under pressure necessary to operate the mower lift actuators described in detail below. It is also preferable to arrange the engine so that it is located behind the axis of the drive wheels so that the vehicle will not have a tendency to tip down in a forward direction.

The operator's seat 13 and the cover over the engine compartment is molded as a single structure or cover unit 16 formed, for example, of fiber glass. In the illustrated embodiment the cover unit 16 formed with a rearward open top compartment 17 extending between the steering wheels 12 and behind the engine compartment 14. This compartment may be used to carry miscellaneous tools or supplies. The cover unit may be mounted on the frame of the vehicle in any desired manner so long as it can be tipped up or removed to provide access to the various drives and assemblies which are located beneath the cover.

Extending forward from the operator's seat 13 is a platform 18 on which the driver may rest his feet and which may be used as a step when the driver gets on and off of the vehicle. Also a steering wheel 19 is mounted on a support column 21 in a convenient location for the operator. The steering wheel 19 is connected to steer the steerable rearward wheels 12 through any suitable arrangement such as cables extending along the support column. The support column is preferably mounted for swiveling movement around the axis of its lengthwise portion 22 so that the steering wheel may be moved to the side so that the operator can easily get into or out of the seat 13.

The vehicle with the forward operator's seat, front drive wheels, and rear steering wheels is particularly desirable. The operator is positioned at the front of the vehicle and has an unobstructed view of the area being mowed. The weight distribution between the front and rearward wheels is good with this arrangement since the engine and most of the mowers are located between the front and rear wheels. Further the driving torque reaction tends to press the rearward steering wheels downward so the vehicle does not tend to tip over backwards even when climbing relatively steep slopes.

The illustrated mower is provided with five reel-type mower units which are similar in construction. The first mower unit 26 is mounted immediately behind the drive wheels 11 and symmetrical with respect to the central longitudinal axis 27 of the vehicle. Two forward mower units 28 and 29 are mounted in alignment with each other immediately ahead of the drive wheels 11. One forward mower is mounted on each side of the longitudinal axis 27 and positioned to overlap the adjacent end of the central mower 26. Two additional outboard mower units 31 and 32 are also mounted on the vehicle at a location just behind and outboard from the drive wheels 11. Here again the mowers 31 and 32 are positioned to overlap the cut of the associated mowers 28 and 29.

All of the mower units 26, 28, 29, 31, and 32 are driven by the vehicle engine through flexible cables 26a, 28a, 29a, 31a, and 32a, respectively, so that each of the reels of the mower units is separately powered from the vehicle mounted engine. These cables are represented by center lines in FIGS. 1 and 2. These flexible cables are arranged so that each of the mowers is free to tip or move up and down with respect to the vehicle frame so that the mowers can freely follow the ground contour when cutting. The flexible cables also permit the mowers to be moved between the operating position and the retracted position, discussed in detail below, without disconnecting the drive.

The geometric arrangement of the mowers, best illustrated in FIG. 1, is one important feature of this invention. A vehicle having one pair of nonsteerable wheels and another pair of steerable wheels turns about a center of turning which lies along a turning line 33 which is coaxial with the axis of rotation of the nonsteerable wheels. The radius of turning, of course, varies with the amount of turning of the steerable wheels, but always lies along the turning line 33.

If a mower were mounted on the turning line 33, no lateral sliding of the mower would occur as the vehicle turned. However, when the mower is spaced either in front of or behind the mowing line, the mower slides laterally as the vehicle is turned, an amount which is a function of the forward or rearward spacing between the mower and the turning line.

With the geometry, best illustrated in FIG. 1, the mowers 28 and 29 are spaced forward from the turning line 33 a distance substantially equal to the rearward spacing of the mower 26 from the turning line 33. With this arrangement lateral sliding of each mower is similar in magnitude and the mower 26 will provide a cut which overlaps the cut of the mowers 28 and 29 even when the vehicle is turning relatively sharply and even though the mower 26 overlaps the two mowers 28 and 29 by only a small amount. Therefore, excessive overlapping of these mowers is not required to insure that skipping will not occur.

Similarly the mowers 31 and 32 are in alignment with each other and spaced behind the turning line 33 a distance which is substantially equal to the forward spacing between the turning line 33 and the forward mowers 28 and 29. Here again a minimum of overlap is required to prevent skipping when the vehicle turns. It is recognized that the mower 26 is spaced slightly behind the outboard mowers 31 and 32 but the difference in spacing is small and all of the rearward mowers 26, 31, and 32 are in substantial alignment.

The effectiveness of this arrangement can be illustrated by one representative mower wherein five mowers, each having a reel providing a cut 30½ inches long, are arranged with sufficiently small overlaps to prevent skipping and still provide a total swath or cut in excess of 12 feet.

In addition the geometric arrangement of the mowers insures that all grass is cut by one or another of the mowers before it is reached by any of the vehicle wheels. This prevents inferior cutting which is often encountered when the grass is cut after it has been pressed down by vehicle wheels.

Still further this arrangement permits the operator to easily observe the cutting operation of the side mowers which is particularly important when trimming around trees or other obstacles. Also the arrangement of the mower close to the turning line 33 minimizes lateral sliding of the mowers during the turning of the vehicle.

Figure 3:
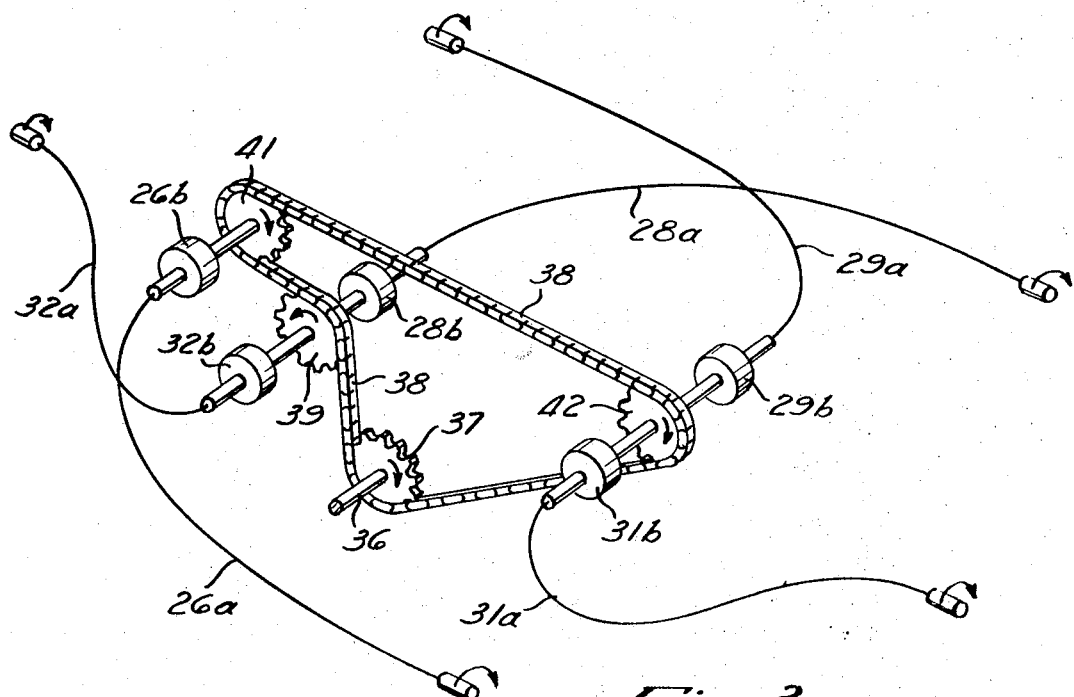
FIG. 3 is a fragmentary schematic illustration of the drive for the flexible cables which separately power each of the mower units.

Referring to FIG. 3, the power for driving the mowers is provided by the engine through the power take-off shaft 36 which in the illustrated embodiment rotates in a clockwise direction. Mounted on the power take-off shaft is a drive sprocket 37 meshing with a drive chain 38. The drive chain 38 extends around three driven sprockets 39, 41, and 42 which are journaled on suitable bearings for rotation about their axis. The sprocket 39 rotates in an anticlockwise direction with the sprocket 37 in a clockwise direction and the two sprockets 41 and 42 rotate in the same direction as the drive sprocket 37, a clockwise direction. The flexible cable 26a is driven by the sprocket 41 through a manually or hydraulically engageable clutch 26b of any suitable type so that the cable rotates in a clockwise direction as viewed from the mower end thereof.

The two cables 28a and 32a are connected to the front and back sides of the sprocket 39 through manually or hydraulically operated clutches 28b and 32b, respectively. With this arrangement the cable 28a rotates in a clockwise direction as viewed from the mower end thereof and the cable 32a rotates in an anticlockwise direction as viewed from its mower end. The two drive cables 29a and 31a are also connected through similar clutches 29b and 31b to the front and back sides of the sprocket 42, respectively. With this arrangement the cable 31a rotates in a clockwise direction as viewed from its mower end while the cable 29a rotates in an anticlockwise direction then viewed from its mower end.

With this arrangement the cables 26a, 28a, and 31a all rotate in the same direction when viewed from their mower ends and the cables 29a and 32a rotate in the opposite direction when viewed from their mower ends. This results in proper mower rotation with all of the mowers rotating in the same direction with respect to the forward direction of the vehicle. Each of the clutches 26b, 28b, 29b, and 32b is provided with a suitable operating handle (not illustrated) accessible to the operator so that the operator may selectively and separately control the operation of each of the mower units.

Since all of the reel-type mower units are similar in construction, only the driving connection between the mower 26 and the flexible cable 26a will be described in detail with reference to FIGS. 4 and 4a, with the understanding that a similar structure is used between each of the other mower units and their associated drive cables.

The flexible shaft 26a is provided with a tubular housing 46 which is anchored against rotation at the power input end thereof and is connected to the associated mower through a swivel connector 47 at the output end. The swivel connector includes a tubular support 48 welded on the mower and providing a shoulder 49 engaged by a flange 51 on a swivel connecting element 52 so that the swivel element 52 can rotate with respect to the support 48. A tube nut 53 locks the housing 46 to the swivel connector 52.

Extending through the housing 46 is the flexible drive cable 54 which is anchored at its end in a shaft 56 journaled in bearings 57 within the support 48. Mounted on the end of the shaft 56 and keyed thereto is a drive sprocket 58. A driven sprocket 59 is supported on a slip clutch assembly 61 at the end of the reel 62 and is connected to the drive sprocket 58 by a chain 63. In normal operation, when the slip clutch 61 is not slipping, rotation of the flexible shaft 54, causes rotation of the reel 62.

The driven sprocket 59 is preferably larger in diameter than the drive sprocket 58 so that a speed reduction is provided. This reduces the torque required to be transmitted by the flexible cable 54 for a given torque requirement of the reel 62.

The slip clutch 61 is provided to prevent damage to the cable in the event that the reel encounters a stone, a stick, or the like, and is locked against rotation. This clutch includes a first driven plate 64 keyed to the end of the reel 62 and a second driven plate 66 on the opposite side of the driven sprocket 59. Opposed friction elements 67 and 68 are carried by the plates 64 and 66, respectively, and are arranged to engage opposite sides of the driven sprockets 59.

Adjusting screws 69 extend through the plate 66, a resilient washer 71 in the plate 64, and are threaded into nuts 72. The adjusting screw 69 prevents relative rotation between the two plates 64 and 66 and in cooperation with resilient washers 71 produces a resilient force urging the friction elements into engagement with the opposite sides of the driven sprocket. These adjusting screws 69 may be tightened or loosened as required so that the clutch will continuue to drive without slippage until a predetermined torque is encountered. When the driving torque for the reel exceeds this predetermined torque, the clutch slips and prevents damage to the system. Since the slip clutch 61 is located after the speed reduction, the adjustment of the clutch is not particularly critical because variations in adjustment tend to be reduced by the speed reduction drive.

In some instances, however, it may be desired to locate the slip clutch at the drive end of the cable even though such a clutch location would result in more critical adjustment requirements. It is important, however, in most installations to provide a drive which includes some form of slip means to prevent overloading the flexible cables.

Referring to FIG. 4a, a metal strap 73 is mounted on the housing 46 so that it extends the length thereof. This strap is wider than it is thick so that it may bend easily in the directions indicated by the arrow 74 while it provides substantial resistance to bending in lateral directions perpendicular to the arrow 74. The strap 73 is perfectly positioned along the side of the cable housing 46 so that the smooth curve of the cable illustrated in FIG. 1 is in the direction indicated by the arrow 74. With this arrangement the strap does not resist such bending to any appreciable extent and it assists the cable in forming a smooth relatively large radius bend. When obstacles are encountered by the reel, which tend to overload the flexible cable, the strap 73 prevents twisting or knotting of the cable housing and thus protects the cable against damage. With this arrangement the flexible drive cable can safely carry larger torques and is protected against damage when high impulse loads are encountered.

Each of the mower units is provided with a hydraulic actuator to move the mower unit between an extended operative position and a retracted position. The two forward mowers 28 and 29 extend generally horizontally on the opposite sides of the longitudinal axis 27 when in the operative position and extend substantially vertically in the retracted position. The mower unit 28 is illustrated in the retracted position in FIGS. 1 and 2 and the mower 29 is illustrated in the extended position.

The center mower 26 does not tip up when moved to the retracted position, but merely retracts upward to the retracted position illustrated in phantom in FIG. 2.

The two outboard mowers 31 and 32 retract from an extended operative position to a retracted position in which they extend back along the vehicle over the rearward steerable wheels 12. In FIGS. 1 and 2 the mower unit 31 is in the retracted position and its extended position is illustrated in phantom. In FIG. 1 the mower unit 32 is in the extended position.

FIG. 5 illustrates the counterbalancing and retraction mechanism for the forward mower 28 which is illustrated in this figure in the operative position. The mower 28 and all of the mower units are provided with a cover element 81 which extends between the two ends and provides the principal frame structure of the reel unit itself. A support arm assembly 82 includes two parallel arms 82a and 82b which are mounted on a support tube 82c. The support tube 82c is mounted on the vehicle frame 9 for rotation about a pivot axis 83. Each of the arms is provided with a lateral extension 84 which is pivoted to the frame 81 at 86 substantially midway between the two ends of the reel unit. This pivot permits the mower unit to tip to follow the contour of the ground. The support arm assembly 82 extends generally horizontal from the pivot 83 when the mower is in the operative position and rotates about the axis 83 upward to the phantom position when the mower is in a retracted position. The mower 28 hangs substantially vertically when in the retracted position.

The power for moving the mower between the extended and retracted position is provided by a hydraulic actuator 87 consisting of a cylinder 88 mounted on a vehicle frame 9 and a piston 89 reciprocable in the cylinder 88. The gland assembly 91 is mounted in the cylinder 88 to guide the piston 89 and also provide a sliding seal therewith.

The outer end of the piston 89 engages a roller 92 carried by a lateral projection 93 on the support tube 82c. When hydraulic fluid under pressure is admitted to the pressure chamber 94, sufficient force is developed to extend the piston 89 and move the roller to the phantom position 92a and thereby raise the mower 28 to the retracted position. When the chamber 94 is exhausted, the weight of the mower returns the mower to the extended operative position. Preferably the control system for the actuator 87 is provided with a flow restriction in the line to limit the rate of movement of the mower to the operative position. A suitable three-way valve (not illustrated) is provided to selectively connect the chamber 94 to the source of hydraulic fluid under pressure and the reservoir return.

Counterbalancing is provided to support a substantial portion of the weight of the mower when the mower is in the operative position. This counterbalancing is provided by a mechanical spring 96 which extends into the tubular piston 89 from the cylinder end wall 97, and urges the piston toward the extended position. In one particular embodiment of this invention the mower unit weighs approximately 120 pounds and the spring 96 is sized to support approximately 90 pounds when the mower is in the operative position. With this arrangement only about 30 pounds of the mower rests on the mower roller 100 as it moves across the ground. This minimizes mower digging particularly in turns where some sliding occurs.

The various elements are proportioned so that the mower can drop down below the illustrated position to follow the contour of the ground. For example, the mower can drop until the roller 92 reaches the position 92b illustrated in phantom. It should be noted that as the mower drops down to a position below the illustrated position, the effective lever arm of the spring 96 decreases. This lever arm is equal to the distance between the pivot axis 83 and the axis of the roller 82 perpendicular to the direction of piston movement. Since the lever arm decreases as the roller 92 moves toward the position 92b at the same time the spring 96 is further compressed, the counterbalancing force of the spring remains substantially constant through this movement. Similarly as if the mower rides up over a high point in the ground, the roller 92 moves slightly to the right from the full line position increasing the effective lever arm while decreasing the spring force. The geometry of this mechanism is arranged so that counterbalancing force of the spring 96 remains substantially constant throughout the normal operating range of movement of the mower. The counterbalance provides a substantial assist in supporting the weight of the mower and excessive pressures need not be provided in the actuator 87. The pivotal mounting of the support arm 82 at 83 cooperates with the pivotal mounting at 86 to provide complete freedom so the mower unit can freely follow the ground.

The end of the actuator 87a for the mower unit 29 is illustrated in FIG. 5 and abuts the end of the actuator 87 for the mower 28. In fact a common wall 97 is provided between the two actuators so they occupy a minimum space. Preferably the actuator cylinders 88 are manufactured by welding a closure wall on the end of a piece of tubing and mounting a gland and bearing assembly 91 in the other end. All of the actuators for the mower units utilize this structure and a standard gland and bearing assembly. The length and stroke of the actuator can be changed by merely making the piece of tubing longer or shorter as desired. With this arrangement manufacturing costs are minimized.

FIG. 6 illustrates a support and retraction arrangement for the center mower 26. Here again a support arm assembly 101 is pivoted on the vehicle frame 9 for rotation about a pivot axis 102. A support arm assembly 101 is again provided with two parallel arms formed with lateral projections 103 at their outer end which extend down beside the front and back of the mower housing 81 and pivotally support the mower at 104 substantially midway between the ends of the mower. A roller 106 mounted on the support arm assembly 101 is engaged by the piston 107 of the actuator 108.

Here again the cylinder of the actuator 108 is formed by a piece of tubing 109 closed at one end by an end wall 111 welded to the tube 109 and provided with a gland and bearing assembly 91 identical with the corresponding assembly in the actuator 87.

In this instance a shorter stroke actuator is provided because the mower is not raised as far when it is retracted. Therefore, the piston 107 is shorter than the piston 89. Here again a spring 112 urges the piston 107 toward the extended position and the geometry of the mechanism is arranged so that the weight of the mower supported by the ground is about 30 pounds when the mower weighs 120 pounds. Also the geometry is arranged so that the weight of the mower supported by the ground remains substantially constant when the mower moves up and down to follow the ground contour. Here again free floating of the mower 26 is provided since it can move up and down with respect to the vehicle, causing pivotal movement of the support arm assembly 101 about the pivot 102 and since it is also free to tip by pivoting around the pivot axis 104.

Referring to FIGS. 1 and 7, the mower unit 32 is supported by a support arm assembly 116 which is pivotally connected at 117 to the mower housing 81 substantially midway between the ends of the mower uinit. In FIG. 2 the support arm assembly 116 for the mower 31, which is similar to the support arm assembly 116 of the mower 32, is illustrated in side elevation. The support arm assembly 116 is pivoted for rotation about a horizontal pivot axis 118 on an actuator bracket 119. The actuator bracket 119 is in turn pivoted on the frame 9 of the vehicle for rotation about a vertical pivot axis 121. The two pivot axes 118 and 121 are provided since two different movements are required for the retraction of the outboard mower units 31 and 32.

A retraction actuator 122 is mounted on the actuator bracket 119 in a vertically extended position and is provided with a piston 123 which engages a roller 124 carried by the support arm assembly 116. Here again the retraction actuator 122 is formed by welding an end plate 126 onto a tube 127 to close one end and a mounting gland and bearing assembly 91 in the other end. A spring 128 resiliently urges the piston 123 in a downward direction to provide counterbalancing for the mower 32.

Here again the geometry of the mechanism is arranged so that a substantially constant weight of about 30 pounds rest on the mower roller 100 when the total weight of the mower is in the order of 120 pounds. Also the mechanism is arranged so that the mower can raise and lower to follow the ground contour which causes pivotal movement about the axis 118. Further the mower is free to tip with respect to the support assembly 116 about the pivot 117.

When the actuator 122 is pressurized the support arm assembly 116 rotates upward through a distance necessary to raise the mower above the steering wheels 12 as illustrated for the mower 31 in FIG. 2. The entire support assembly is then pivoted around the pivot axis 121 until the mower extends back along the vehicle over the steering wheels 12. In the illustrated embodiment the pivotal movement around the vertical pivot axis 121 is provided manually by the operator. Since there is no lifting or lowering required for this movement, manual swinging of the mower to the rearwardly extended position is not difficult. A lock arm 131 is journalled on the actuator 122 within a tube 132 and is provided with latch portion 133 which fits against a stop 134 to releasably hold the mower in the extended position against a stop (not illustrated). The arm 131 extends to a position accessible to the operator so that the arm can also be used to manually swing the mower about the pivot 121. If desired, of course, power operation may be provided with suitable actuating means to swing the mower to the rearward position. In fact, the overtravel of the support arm assembly 116 can be used through suitable cam means or linkage to cause the swinging movement about the vertical pivot if desired.

It should be understood that a separate valve mechanism should be provided for each of the five actuators to permit separate control of the retraction and extension of the individual mower units. Preferably the operators for the valves should be arranged so that a single operator control operates both the valve for a given mower and the clutch for that mower drive. Suitable overtravel may be utilized so that the lever which operates the valve can cause extension of the mower and then further travel engagement of the associated clutch. In this way the operator can extend a given mower and then engage the clutch when it is in the extended position through the use of a single control. Of course, retraction would result in stopping of a given mower after which further movement of the control would produce retraction. If desired the clutches 26b, 28b, 29b, 31b, and 32b may be normally engaged clutches which are released by hydraulic pressure. With such an arrangement the clutch may be coupled to the actuator control valves so that each mower automatically stops when it is retracted.

With a power mower incorporating this invention a relatively small vehicle can be used to power a large number of mowers and provide a wide swath in a single cut. Each of the mowers is retractable so that the mowers will not be damaged when the vehicle is operated over rough terrain and so that the vehicle can be stored in a relatively small space. The use of a simplified flexible cable drive for each of the mowers permits full retraction and full floating action of the mowers during mowing operation without complicated structures required in most prior mower arrangements. The use of counterbalancing to support a substantial portion of the weight of each mower further improves operation.

If desired the operator can mow with any combination of mowers. For example, with the forward and outboard mowers retracted, mowing can be done with only the center mower 26. Similarly, any combination of mowers can be used at a given time. For example, the mowers 26 and 28 can be operated while the remaining mowers are retracted. Since the mower can be operated with any combinations of mowers in either the retracted or extended position, the operator has considerable flexibility and can efficiently operate the mower for trimming as well as wide cutting. The location of the operator at the front of the vehicle, where he can easily observe the operation of the mowers and the terrain over which the mower is operated, promotes efficient and effective operation. Further the geometry or mower arrangement insures no skipping even when the mower is operated around sharp corners while minimizing the overlapping requirement between mowers.

Although a preferred embodiment of this invention is illustrated, it is to be understood that various modifications and rearrangements of parts may be resorted to without departing from the scope of the invention disclosed and claimed herein.

What is claimed is:

1. A power mower comprising a wheeled vehicle having a power unit operable to drive the vehicle, a pair of mower units supported on opposite sides of said vehicle, each mower unit being movable between an operative generally horizontal position and a retracted position, said mower units when in said operative position being supported for substantially free vertical and tipping movement with respect to said vehicle, and a flexible drive shaft connected between said power unit and mower units permitting said movement of said mower units without being disconnected, said flexible drive shaft including means resisting deflection in at least one lateral plane while permitting substantially free deflection in another lateral plane substantially perpendicular to said one lateral plane.

2. A power unit as set forth in claim 1 wherein said means resisting deflection is a strap extending along and secured to said flexible shaft, said strap having a width substantially greater than its thickness whereby it is substantially more flexible in lateral planes substantially perpendicular to said one lateral plane.

3. A power mower as set forth in claim 1 wherein said vehicle is provided with two non-steerable wheels, and where there are five mower units including said pair, said units being arranged in two groups with one group ahead and one group behind said wheels, one group including three of said units located in substantial alignment and the other group including two substantially aligned units.

4. A power mower comprising a wheeled vehicle having a power unit operable to drive the vehicle, a pair of mower units supported on opposite sides of said vehicle, each mower unit being supported by a lift unit powered by said power unit and movable between an operative generally horizontal position and a retracted position, each lift unit including a piston and cylinder actuator operated by fluid under pressure, each actuator having spring means to counterbalance said mower units and support a substantial portion of the weight thereof when said mower units are in said operative position, said mower units when in said operative position being supported for substantially free vertical and tipping movement with respect to said vehicle, and a flexible shaft drive connected between said power unit and said mower units, said flexible shaft drive permitting said movement of said mower units without being disconnected.

5. A power mower as set forth in claim 4 wherein said mower units are movable through a substantial range of operative positions without substantially changing the counterbalancing provided by said spring means.

References Cited

UNITED STATES PATENTS

| | | | |
|---|---|---|---|
| 2,145,467 | 1/1939 | Waddell | 56—7 |
| 2,325,252 | 7/1943 | Krenzke | 56—7 |
| 2,672,000 | 3/1954 | Speiser | 56—7 |
| 2,764,864 | 10/1956 | Kinkead | 56—7 |
| 3,058,281 | 10/1962 | Lewis | 56—7 |
| 3,177,638 | 4/1965 | Johnson | 56—7 |
| 3,400,521 | 9/1968 | Caldwell | 56—6 |

FOREIGN PATENTS

| | | | |
|---|---|---|---|
| 603,211 | 6/1948 | Great Britain | 56—233 |

LOUIS G. MANCENE, Primary Examiner

J. A. OLIFF, Assistant Examiner

U.S. Cl. X.R.

56—26